United States Patent
Ganser et al.

(10) Patent No.: US 6,502,545 B1
(45) Date of Patent: Jan. 7, 2003

(54) METHOD AND APPARATUS FOR ADJUSTING AN INTERNAL COMBUSTION ENGINE WITH VARIABLE VALVE TIMING

(75) Inventors: Thomas Ganser, Wernau; Igor Gruden, Leonberg; Rainer Kessler, Leutenbach; Peter Klein, Stuttgart; Charles Robert Koch, Remseck/Pattonville; Kurt Maute, Sindelfingen; Klaus Wunderlich, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 1 day.

(21) Appl. No.: 09/709,348

(22) Filed: Nov. 13, 2000

(30) Foreign Application Priority Data

Nov. 10, 1999 (DE) .......................... 199 53 933
Nov. 10, 1999 (DE) .......................... 299 23 272

(51) Int. Cl.$^7$ ............................................. F02D 13/00
(52) U.S. Cl. ..................... 123/399; 123/90.15; 123/348
(58) Field of Search ............................ 123/345, 346, 123/347, 348, 90.15, 399

(56) References Cited

FOREIGN PATENT DOCUMENTS

DE          195 30 274          2/1997

OTHER PUBLICATIONS

US 6,328,015, 10/1999, Russell et al. (withdrawn)*

* cited by examiner

*Primary Examiner*—Willis R. Wolfe
*Assistant Examiner*—Johnny H. Hoang
(74) *Attorney, Agent, or Firm*—Crowell & Moring LLP

(57) ABSTRACT

A method for adjusting an internal combustion engine with variable valve timing wherein the current position of the accelerator pedal is associated with a set air mass and a set pressure. The set pressure is compared with a reference pressure and control of the set air mass takes place via the throttling device in the intake pipe when the pressure falls below the reference pressure, and control of the set air mass is carried out via the engine valves when the pressure exceeds the reference pressure.

18 Claims, 3 Drawing Sheets

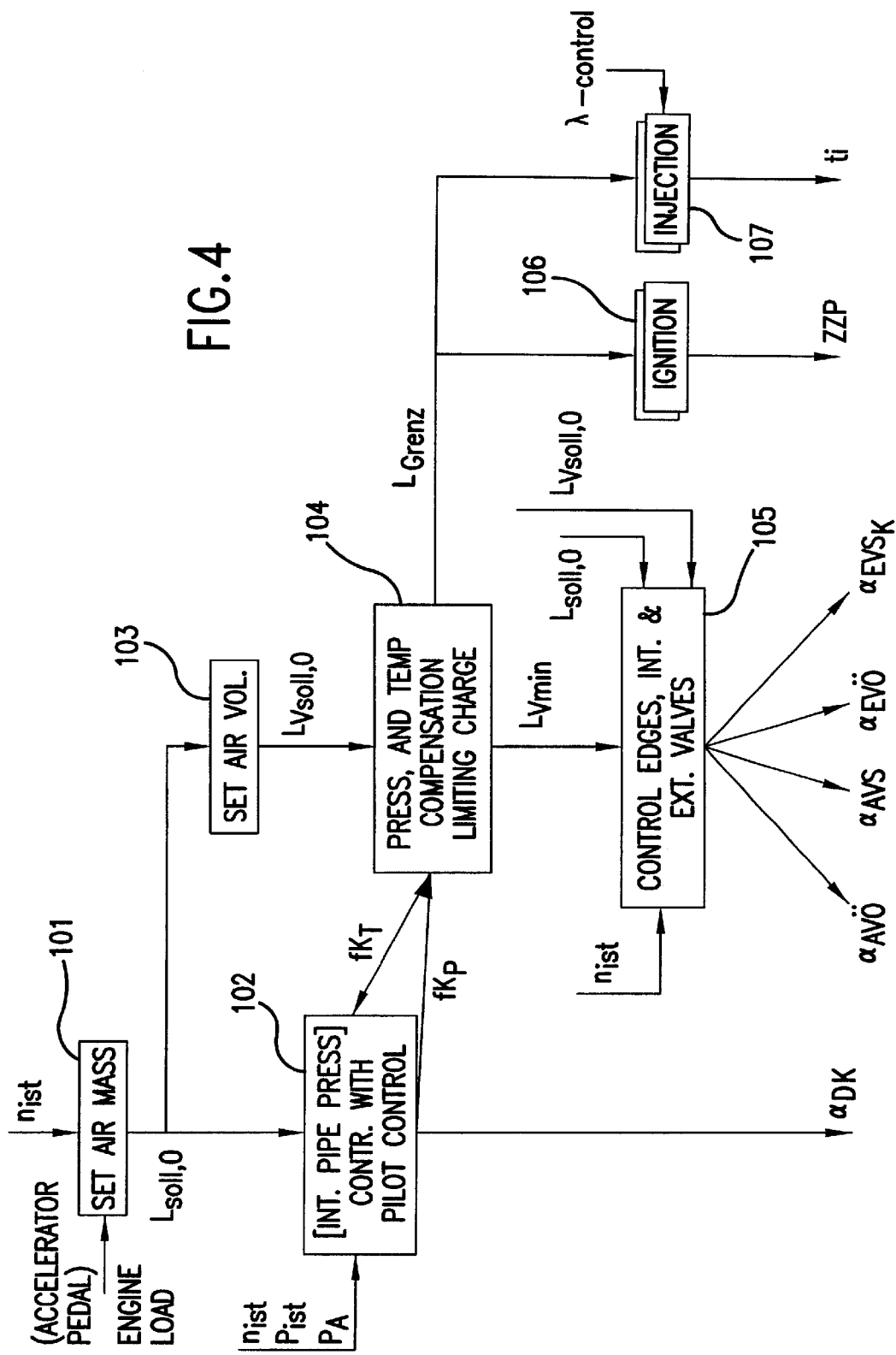

METHOD AND APPARATUS FOR ADJUSTING AN INTERNAL COMBUSTION ENGINE WITH VARIABLE VALVE TIMING

This application claims the priority of German Patent Document 199 53 933.2 filed Nov. 10, 1999 and German Patent Document 299 23 272.7 filed Nov. 10, 1999, the disclosure of which are expressly incorporated by reference herein.

BACKGROUND AND SUMMARY OF THE INVENTION

The invention relates to a method and an apparatus for adjusting an internal combustion engine with variable valve timing.

German Patent DE 195 30 274 A1, shows a piston-type internal combustion engine with fully variable valve gear, in which the opening and closing points of the engine valves can be controlled independently of one another. According to the method in DE 195 30 274 A1, the load input via the accelerator pedal is converted by means of a fuel control unit into a quantity of fuel to be injected, the injection point and ignition point being determined by means of corresponding maps. The required quantity of fresh air is controlled by controlling the engine valves. A lambda probe is used to measure the air ratio (lambda), which is used in an air control unit as the basis for control of the mass flow of fresh air. The air ratio is controlled by manipulating the opening times of the engine valves.

Because control of the air ratio is only possible to the maximum fresh air charge for the cylinder at certain operating points, the air control unit and the fuel control unit are linked in order to provide the possibility of reducing the quantity of fuel injected independently of the position of the accelerator pedal by multiplying the quantity of air determined by a correction factor. The correction factor is determined from a set/actual comparison of the quantity of incoming air. It is possible to determine the actual quantity of air by means of an air mass meter.

The disadvantage of this method is that, because of the measurement, and the control operation following the measurement the quantity of air to be supplied is adapted fundamentally with a delay, with the result that a fuel/air ratio is different from the stoichiometric ratio is set, especially in the region of dynamic operations, e.g. in the region of large changes in speed.

German Patent DE 195 30 274 A1 furthermore discloses converting the driver's intention, to be input via the accelerator pedal, into a set charge in the cylinder as a function of the air temperature and the intake-pipe pressure. This set charge is being used to control the variable valve gear. Injection and ignition are controlled as a function of the quantity of air determined from the set charge.

Although this method takes into account the temperature and pressure of the induction air, DE 195 30 274 A1 indicates only a general dependence but does not give any specific instructions for calculating the required quantity of air. Moreover, there is no support for adaptation of the valve overlap and hence of the residual gas content or for switching to a different valve operating mode, with consideration of a suitable method, especially in the case of major compensating operations required by the environment.

The underlying problem faced by the inventors is to adjust the fuel/air ratio in an internal combustion engine rapidly and reliably in a wide operating range. In particular, the quantity of air is to be pilot-controlled as accurately as possible.

According to the present invention, the internal combustion engine is fitted both with variable valve timing for variable adjustment of engine valves and with a throttling device/valve in the intake pipe. To enable throttle-free adjustment and control of the internal combustion engine over wide ranges of operation, air is supplied to the combustion chambers of the internal combustion engine preferentially by manipulating the opening and/or closing points of the engine valves and for conventional throttle control to be resorted to only in ranges in which adjustment is not possible exclusively by means of the engine valves or in which thermodynamic advantages can be obtained.

As a criterion for deciding whether adjustment should be performed by means of the engine valves or the throttling device, the set pressure, taking into account the ambient temperature, is compared with a reference pressure, which is advantageously identical with the ambient pressure. If the set pressure exceeds the reference pressure, the set air mass is controlled by means of the engine valves with the throttling device completely open. If, on the other hand, the set pressure falls below the reference pressure, the set air mass is controlled by means of the throttling device.

As a function of the position of the accelerator pedal, a set air mass is advantageously first determined. This air mass is associated with a set pressure in the intake pipe, which is corrected by a correction factor proportional to the ambient temperature. If the temperature-corrected set pressure is lower than the reference pressure—in particular the current ambient pressure—the throttling device is activated. In this case, the ambient pressure upstream of the throttling device is reduced to the corrected set pressure by changing the position of the throttle valve, and the charge corresponding to the set air mass is supplied to the cylinders. This embodiment offers the advantage that it is possible to switch to conventional throttle-valve control, especially in ranges of low load and high engine speed, thereby making it possible to avoid vibration and inertia problems at this operating point with the valve timing system, which is preferably operated electromagnetically. Furthermore, thermodynamic advantages are also obtained. Outside the relatively small range in which throttling is advantageous or the intake-air temperature correction leads to anything up to complete opening of the throttle valve, throttle-free adjustment of the quantity of fresh air to be supplied is performed by means of the engine valves, preferably by adapting the inlet closing point of the inlet valve.

The closing point of the inlet valve is expediently corrected by means of a compensating function, the polynomial coefficients of which are read out from maps. The polynomial coefficients are ideally plotted against the engine speed in load or charge maps. The compensating function may have a linear or quadratic profile.

The compensating function is expediently provided with data in the form of corresponding polynomial coefficients for each valve operating mode. The switch to a new valve operating mode advantageously takes place after volumetric cylinder charging, thereby ensuring that the switch is always made at the same crank angle position, irrespective of the degree of compensation. All other control variables such as the opening point of the inlet valve, the opening and closing points of the exhaust valves, ignition and injection are furthermore coupled to the set air mass.

In an advantageous development, it may be expedient to limit the set air volume to be supplied via the engine valves, to which correction factors, that take account of the outside pressure and outside temperature, have been applied, to a predetermined maximum limits to prevent a larger corrected set air volume than would be possible at full load under standard conditions from being calculated at high engine loads. Capping the corrected set air volume to the permissible maximum limits the period of opening of the inlet valves, thereby avoiding displacement of the inlet closing point to an operating point that impairs combustion. It is then possible to work back reciprocally from the air volume in order to determine a cylinder-specific, maximum permissible limiting mass flow that can be used for ignition and injection.

Taking account of the differential volume, formed from the corrected air volume and the set air volume based on standard conditions, the inlet closing point of the inlet valve is expediently manipulated by means of a subsequent compensating function. This ensures that the corrected set air volume supplied to the cylinder corresponds to the set air mass under standard conditions. This has the advantage that all other map-dependent variables, such as ignition and injection and the opening and closing points of the remaining engine valves, can be retained.

Other objects, advantages and novel features of the present invention will become apparent from the following detailed description of the invention when considered in conjunction with the accompanying drawings.

BRIEF DESCRIPTION OF THE DRAWINGS

FIG. 4 shows the structure of the apparatus for adjusting an internal combustion engine with variable valve timing and with a throttling device.

DETAILED DESCRIPTION OF THE PREFERRED EMBODIMENT

Figure 1:
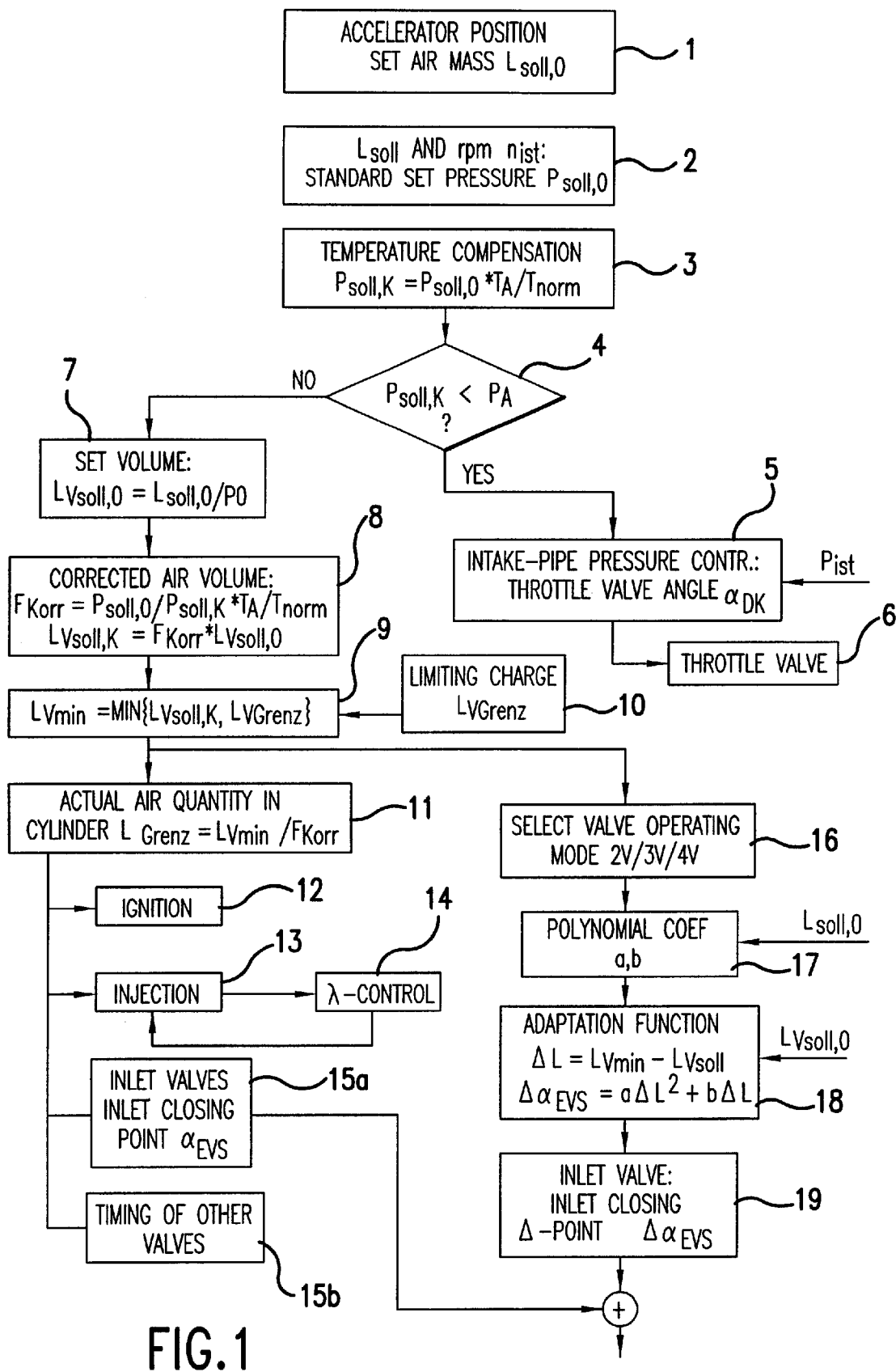
FIG. 1 shows a flow diagram relating to the adjustment of an internal combustion engine with variable valve timing and a throttle valve.

The flow diagram illustrated in FIG. 1 represents a method for setting a stoichiometric fuel/air ratio in the combustion chambers of a piston-type internal combustion engine, which is fitted both with a throttling device in the intake pipe, in particular a throttle valve, and with a variable valve timing system. The valve timing system can be either a fully variable electromagnetic valve timing system with electrically controllable electromagnets for closing and opening the valves of the internal combustion engine or systems with pneumatic or hydraulic control or two camshafts that can be adjusted relative to one another.

According to method step 1, a set air mass $L_{soll,0}$ associated with the desired or demanded engine torque, which is to be fed to the combustion chambers of the internal combustion engine as a standard air mass under normal conditions, is first of all determined in a regulating and control unit of the internal combustion engine, e.g. by a vehicle dynamics control system, from the position of the accelerator pedal, which represents an engine torque desired by the driver, or from some other torque input variable. In the following method step 2, a set intake-pipe pressure $P_{soll,0}$ which represents the intake-pipe pressure to be set as an absolute pressure under normal conditions, is determined from the set air mass $L_{soll,0}$ and the current engine speed $n_{ist}$ in accordance with a stored map.

In the following method step 3, the set intake-pipe pressure $P_{soll,0}$ is increased or reduced relative to the standard temperature by a temperature correction factor $fk_T$ and converted to a temperature-corrected set intake-pipe pressure $P_{soll,k}$. The temperature correction factor $fk_T$ is calculated from the ambient temperature $T_A$ and a known standard temperature in accordance with the relation $$fk_T = T_A/T_{norm}.$$

The temperature correction factor $fk_T$ is used to determine the set intake-pipe pressure $P_{soll,k}$ in accordance with $$P_{soll,k} = P_{soll,0} * fk_T.$$

This has the advantage that, with engine operation throttled, the temperature correction generally has the effect of relieving the throttling effect before a further correction takes place by means of timings.

In a comparison between the set intake-pipe pressure $p_{soll,k}$ and the ambient pressure $p_A$ carried out in method step 4, the system determines whether the charge correction should take place by adjustment of the inlet-valve timings alone or by changing the throttling effect (adjusting the throttle valve angle of the throttle valve) or by a combination of both methods.

If the set intake-pipe pressure $p_{soll,k}$ is above the ambient pressure $p_A$ ("no" decision), it is not possible to adjust the intake-pipe pressure to the corrected set intake-pipe pressure $p_{soll,k}$ by adjusting the throttling element in the intake pipe. In this case, the ambient pressure $p_A$ is transmitted to the intake-pipe pressure controller, thereby opening the throttle valve fully, with the result that there is no throttling loss in the intake pipe. The combustion chambers are filled with air in accordance with the section of the method corresponding to the "no" decision in method step 4 by adapting the inlet closing point of the inlet valve or inlet valves.

Figure 3:
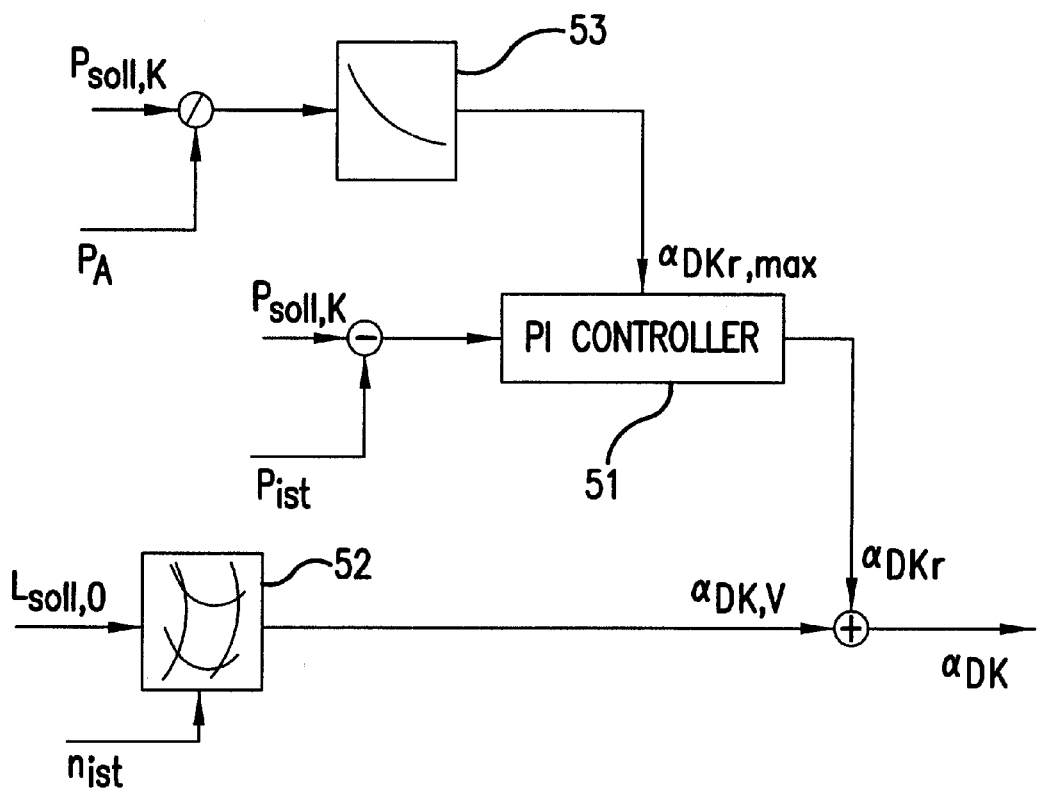
FIG. 3 shows the controller structure of an intake-pipe pressure controller.

If the set intake-pipe pressure $p_{soll,k}$ is less than the ambient pressure $p_A$ ("yes" decision), the quantity of air to be supplied is set by means of the throttling member in the intake pipe. For this purpose, the temperature-corrected set intake-pipe pressure $p_{soll,k}$ is transmitted to the intake-pipe pressure controller and set in the intake pipe by means of the throttling member. In the intake-pipe pressure control operation in accordance with method step 5, a pilot-controlled throttle-valve angle $\alpha_{DK}$ is output as a function of the corrected set intake-pipe pressure $p_{soll,k}$ and the engine speed nit and fed to the throttle valve in accordance with step 6. A deviation of the actual intake-pipe pressure $p_{ist}$ from the set intake-pipe pressure $p_{soll,k}$ is corrected by means of the control loop by adjustment of the position of the throttle valve. An example of an advantageous intake-pipe pressure control system is illustrated in FIG. 3.

All the valve timings are read out from the corresponding maps by means of the set air mass $L_{soll,0}$ from method step 1 and set at the valve gear.

Setting by means of the throttle valve in accordance with the section of the method corresponding to the "yes" decision takes place, in particular, in a region of low load and high engine speed because, in this region, control by means of the variable engine valves would lead to problems of vibration and inertia with the electromagnetically operated valve timing system.

In steps 7 to 19 of the method, the sequence for setting the stoichiometric fuel/air ratio by means of variable valve timing with the throttle valve fully open is illustrated. The current corrected set intake-pipe pressure $p_{soll,k}$ and the current ambient temperature $T_A$ are taken into account in selecting the quantity of fresh air to be supplied.

In method step 7, the set air mass $L_{soll,0}$ under standard conditions is converted into a set air volume $L_{Vsoll,0}$ under standard conditions, taking into account a standard density $\rho_0$. In method step 8, a correction factor $F_{Korr}$ is determined from the ratio of the standard set pressure to the corrected set intake pipe pressure $p_{soll,k}$ taking into account the temperature correction factor $fk_T = T_A/T_{norm}$ in accordance with the relation $$F_{Korr} = p_{soll,0}/p_{soll,k} * fk_T.$$

The correction factor $F_{Korr}$ is used to correct the set air volume $L_{Vsoll,0}$ that would apply under standard conditions:

$$L_{Vsoll,k} = F_{Korr} * L_{Vsoll,0}.$$

In the following method step 9, the minimum $L_{Vmin}$ of the corrected set air volume $L_{Vsoll,k}$ and a maximum possible limiting air charge volume $L_{Vgrenz}$ supplied by method step 10 is determined. This ensures that the maximum air capacity of the cylinders is not exceeded.

After step 10, the procedure is split into two method branches 11 to 15 and 16 to 19 to be executed in parallel.

In method steps 11 to 15b, the system calculates back to the actual quantity of air $L_{Grenz}$ in the cylinder in method step 11 according to the relationship $$L_{Grenz} = L_{Vmin}/F_{Korr},$$

after which it determines the parameters for ignition (method step 12), injection (method step 13 taking into account a λ control system illustrated in method step 14) and, furthermore, the timings for the inlet closing points (basic time $\alpha_{EVS}$ in method step 15a) and the inlet opening points of the inlet valves plus the exhaust opening points and exhaust closing points of the exhaust valves (method step 15b). The optimum ignition point, the optimum injection point and the optimum duration of injection depend on whether the internal combustion engine is operated with 2, 3 or 4 valves. Any possible lambda deviations are eliminated by means of the lambda control system in method steps 13 and 14 by modifying the injection time.

In the parallel method branch 16 to 19, the system ascertains the optimum way of operating with the number of valves to be operated depending on the engine speed and the selection of the minimum volume between the corrected set air volume $L_{Vsoll,k}$ and the volumetric limiting charge $L_{Vgrenz}$. By virtue of the volumetric assessment, the switching always takes place at the same crank angle position.

The switching between the 2-valve, 3-valve and the 4-valve operating mode has a great influence, in particular, on the control of the residual gas. In the 2-valve mode, the system operates with the maximum possible residual-gas compatibility, with the exception of those operating ranges with a low residual-gas compatibility, especially the idling range. In the 3- or multi-valve mode, the system operates with the smallest possible proportion of residual gas. The proportion of residual gas increases with increasing load by virtue of increasing compatibility. In the middle of the part-load range, the proportion of residual gas reaches a maximum, then falls back to a minimum as the load rises further, allowing the maximum possible charge to be achieved.

In order to ensure that the timings of the inlet engine valve are adapted in accordance with the torque desired by the driver within as short a time as possible when there is a change in the operating point, a correction of the inlet closing point, as a function of the difference between the volumetric set charge $L_{Vsoll,0}$ under standard conditions and the actual air volume $L_{Vmin}$ in the cylinder, is determined by means of an adaptation function $\Delta\alpha_{EVS}$ in method steps 17 and 18.

Figure 2:
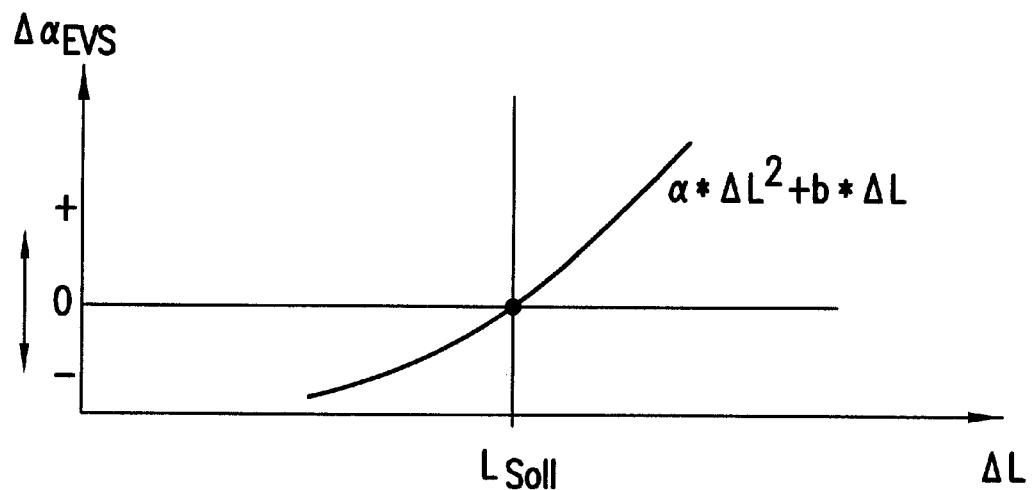
FIG. 2 shows an adaptation function for adapting the inlet closing point of an engine valve to changing operating points.

According to FIG. 2, the adaptation function $\Delta\alpha_{EVS}$ is a quadratic polynomial function with polynomial coefficients a and b, which are determined in method step 17 in FIG. 1. The adaptation function $\Delta\alpha_{EVS}$, which indicates the displacement of the inlet closing point of the inlet engine valve, is determined in accordance with the relation $$\Delta L = L_{Vmin} - L_{Vsoll}$$

$$\Delta\alpha_{EVS} = a * \Delta L^2 + b * \Delta L,$$

the polynomial coefficients a and b being stored in an engine-specific manner in maps as a function of the engine speed, the valve operating mode and the desired air mass $L_{soll,0}$ under standard conditions in accordance with method step 17.

The metering of the volumetric differential quantity of air determined is preferably performed exclusively by adjusting the inlet closing point $\alpha_{EVS,k}$ of the inlet engine valves by adding the closing point of the inlet valve under standard conditions $\alpha_{EVS}$ (method step 15a) and the calculated closing-point correction $\Delta\alpha_{EVS}$ (method step 19).

FIG. 3 shows the controller structure of an intake-pipe pressure controller. The control component $\alpha_{DK,r}$ for the throttle-valve angle is determined from a comparison between the set intake-pipe pressure and the actual intake-pipe pressure $p_{soll,k} - p_{ist}$ by means of the PI controller 51. This control component $\alpha_{DK,r}$ is added to the pilot-control component of the throttle-valve angle $\alpha_{DK,V}$, which is determined from a map 52 as a function of the engine speed $n_{ist}$ and the set quantity of air $L_{soll,0}$. The sum of the two components gives the resulting throttle-valve angle $\alpha_{DK}$. A characteristic 53, which depends on the quotient of the set intake-pipe pressure $p_{soll,k}$ and the outside pressure $p_A$ ensures increasing controller limitation $\alpha_{DKr,max}$ down to zero as the set intake-pipe pressure rises relative to the outside pressure. FIG. 4 gives a schematic representation of the structure of an apparatus for metering in combustion air by adjusting the timings of the engine valves and/or by adjusting the position of the throttle valve in the intake pipe.

The set air mass $L_{soll,0}$ is determined in block 101 as a function of the engine speed $n_{ist}$, the engine load or the position of the accelerator pedal and fed both to the intake-pipe pressure controller (block 102) and to block 103 for determining the set air volume $L_{Vsoll,0}$. In the intake-pipe pressure controller 102, the throttle-valve angle $\alpha_{DK}$ is determined, taking into account the engine speed $n_{ist}$, the actual intake-pipe pressure $p_{ist}$ and the outside pressure $p_A$.

In parallel with the determination of the throttle-valve angle $\alpha_{DK}$, a pressure and temperature compensation and a maximum possible cylinder charge (limiting charge) $L_{Vmin}$ and $L_{Grenz}$ are calculated from the set air volume $L_{Vsoll,0}$ in block 104 as a function of the temperature correction factor $fk_T = T_A/T_{norm}$ and a pressure correction factor $fk_p = p_{soll,k}/p_{soll,0}$. These correction factors being available to the intake-pipe pressure controller both in block 102 and in block 104.

The value $L_{Vmin}$ for the air volume is fed to block 105 for determination of the control edges or times for the inlet valves EV and the exhaust valves AV as a function of the engine speed $n_{ist}$, the set air mass $L_{soll,0}$ and the set air volume $L_{Vsoll,0}$. The timings for exhaust opening $\alpha_{AVO}$ exhaust closing $\alpha_{AVS}$ inlet opening $\alpha_{EVO}$ and inlet closing $\alpha_{EVS,k}$ are fed to the relevant engine valves or valve gear acting on the engine valves.

The value $L_{Grenz}$, which represents the actual quantity of air in the cylinder, is fed to blocks 106 and 107, in which the time ZZP for ignition and the injection quantity and point $t_i$ respectively are determined, taking into account a λ control output.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of adjusting an internal combustion engine with engine valves with variable valve timing and a throttling device in an intake pipe, comprising:

associating a current position of an accelerator pedal with a set air mass ($L_{soll,0}$) and a set pressure ($P_{soll,0}$, $P_{soll,k}$), comparing the set pressure ($P_{soll,0}$, $P_{soll,k}$) with a reference pressure ($P_a$), controlling the set air mass ($L_{soll,0}$) by the throttling device in the intake pipe when the set pressure is less than the reference pressure (Pa), controlling the set air mass ($L_{soll,0}$) via the engine valves when the set pressure is greater than the set reference pressure ($P_a$).

2. The method according to claim 1, wherein the reference pressure ($p_a$) is identical with ambient pressure.

3. The method according to claim 1, further including a step of providing a corrected set pressure ($P_{soll,k}$) determined from a standard set pressure ($P_{soll,0}$) by applying a temperature correction factor ($fk_T$), which is proportional to an ambient temperature ($T_A$), in accordance with a $$fk_T = T_A/T_{norm}$$

$$P_{soll,k} = P_{soll,0} * fk_T$$

in which $P_{soll,0}$ denotes a standard set pressure under normal conditions, $T_{norm}$ denotes a standardised intake temperature under normal conditions $P_{soll,k}$ denotes the corrected set pressure $T_A$ denotes the ambient temperature.

4. The method according to claim 3, wherein the corrected set pressure ($p_{soll,k}$) is limited to the ambient pressure ($p_A$).

5. The method according to claim 3, including the step of adjusting both the air mass by means of the throttling device and by means of the engine valves as a function of the connected set pressure ($p_{soll,k}$).

6. The method according to claim 1, wherein an actual intake pressure ($p_{ist}$) in the intake pipe is adjusted to the set intake pressure ($p_{soll,k}$) by a throttle controller when the set air mass ($L_{soll,0}$) is adjusted by means of the throttling device.

7. The method according to claim 1, wherein an inlet closing point is manipulated in the case where the set air mass ($L_{soll,0}$) is controlled by means of the engine valves.

8. The method according to claim 1, wherein an inlet opening point of the engine valve is held constant when the set air mass ($L_{soll,0}$) is controlled by means of the engine valves.

9. The method according to claim 1, wherein a corrected set air volume ($L_{Vsoll,0}$) is determined from the set air volume ($L_{Vsoll,0}$) by applying a correction factor ($F_{Korr}$), which is proportional to a current ambient temperature ($T_A$), in accordance with the relation $$L_{Vsoll,k} = F_{Korr} * L_{Vsoll,0}$$

and the corrected set air volume ($L_{Vsoll,k}$) for the internal combustion engine is fed to one combustion chamber or several combustion chambers by manipulating the inlet closing point of an inlet engine valve.

10. The method according to claim 3, wherein a correction factor ($F_{Korr}$) is determined as a function of the corrected set pressure ($p_{soll,k}$) in accordance with the relation $$F_{Korr} = (p_{soll,0}/p_{soll,k}) * fk_T.$$

11. The method according to claim 9, wherein the corrected set air volume ($L_{Vsoll,k}$) is limited to the minimum ($L_{Vmin}$) of the two values including the corrected set air volume ($L_{Vsoll,k}$) and a limiting charge volume ($L_{VGrenz}$).

12. The method according to claim 9, wherein a cylinder-specific, maximum permissible limiting mass flow ($L_{Grenz}$) is calculated from the corrected set air volume ($L_{Vmin}$) and the correction factor ($F_{Korr}$) in accordance with the relation $$L_{Grenz} L_{Vmin}/F_{Korr},$$

which is used to determine at least one of an ignition point and a duration of injection.

13. A method according to claim 1, wherein an optimum valve operating mode with two or more valves can be determined as a function of the corrected set air volume ($L_{Vmin}$) and the engine speed ($n_{ist}$).

14. A method according to claim 1, wherein, in order to take into account the current operating point, the inlet closing point is determined as a function of the set standard air volume ($L_{Vsoll,0}$) and the corrected set air volume ($L_{Vmin}$) in accordance with a defined adaptation function ($\Delta\alpha_{EVS}$).

15. The method according to claim 14, wherein that the adaptation function ($\gamma\alpha_{EVS}$) is a quadratic polynomial function with polynomial coefficients a and b in accordance with the relation $$\Delta L = L_{Vmin} - L_{Vsoll,0} \Delta\alpha_{EVS} = a*\Delta L^2 + b*\Delta L.$$

16. The method according to claim 1, wherein the quantity of fuel injected is represented as a function of the limiting air mass ($L_{grenz}$).

17. The method according to claim 1, wherein a quantity of fuel injected is controlled by a lambda probe.

18. An apparatus for adjusting an internal combustion engine, having engine valves with variable valve timing for variable adjustment of the quantity of combustion air to be supplied and a throttling device in an intake pipe, said throttling device being actuated independently of the variable engine valves, said apparatus comprising:

a regulating and control unit having a means for comparing a set pressure supplied to combustion chambers of the internal combustion engine with a reference pressure and a means for providing a control signal to activate the throttling device when the set pressure is less than the reference pressure and a means for providing a second control signal that activates at least one engine valve when the set pressure is greater than the reference pressure.

* * * * *